(12) United States Patent
Liberman (10) Patent No.: US 9,687,787 B2
(45) Date of Patent: Jun. 27, 2017

(54) RECIPROCAL ENHANCEMENT OF REVERSE OSMOSIS AND FORWARD OSMOSIS

(75) Inventor: Boris Liberman, Even Yehuda (IL)

(73) Assignee: I.D.E. TECHNOLOGIES LTD., Kadima (IL)

( * ) Notice: Subject to any disclaimer, the term of this patent is extended or adjusted under 35 U.S.C. 154(b) by 1003 days.

(21) Appl. No.: 13/512,024

(22) PCT Filed: Nov. 25, 2010

(86) PCT No.: PCT/IB2010/055412
§ 371 (c)(1),
(2), (4) Date: May 25, 2012

(87) PCT Pub. No.: WO2011/064731
PCT Pub. Date: Jun. 3, 2011

(65) Prior Publication Data
US 2012/0285886 A1    Nov. 15, 2012

Related U.S. Application Data

(60) Provisional application No. 61/264,256, filed on Nov. 25, 2009, provisional application No. 61/358,969, filed on Jun. 28, 2010.

(51) Int. Cl.
*B01D 61/00* (2006.01)
*B01D 61/06* (2006.01)
(Continued)

(52) U.S. Cl.
CPC .......... *B01D 61/002* (2013.01); *B01D 61/06* (2013.01); *B01D 65/08* (2013.01); *C02F 1/445* (2013.01);
(Continued)

(58) Field of Classification Search
USPC ......................................................... 210/793
See application file for complete search history.

(56) References Cited

U.S. PATENT DOCUMENTS

2006/0144789 A1    7/2006  Cath et al.
2009/0008330 A1*   1/2009  Thorsen et al. .............. 210/636
(Continued)

FOREIGN PATENT DOCUMENTS

DK    WO 2005018782 A1 *   3/2005   ............. B01D 61/06
JP       2003176775           6/2003
WO    WO 2007073207 A1 *   6/2007

OTHER PUBLICATIONS

International Search Report for PCT application No. PCT/IB2010/055412 issued by the ISA/EU dated Nov. 25, 2011.
(Continued)

*Primary Examiner* — Krishnan S Menon
*Assistant Examiner* — Ryan B Huang
(74) *Attorney, Agent, or Firm* — Symbus Law Group, LLC; Clifford D. Hyra (57) ABSTRACT

Periodically operating a forward osmosis (FO) semi-permeable membrane element in reverse osmosis (RO), to yield product extraction on a feed side of the membrane, to flush out a concentration polarization (salt concentration of the feed side and dilution of draw solution on the draw side) across the membrane. Utilizing treated waste water to generate the flushing solution of low osmotic pressure, and gauge pressurizing the flushing solution to the gauge pressure of the draw solution to keep a constant gauge pressure of the solutions. FO process is interrupted every 5-20 minutes for a 10-60 seconds long flushing RO process, thereby increasing the FO throughput five fold and recovering power from the increased throughput, i.e. from the osmotic pressure of the brine.

6 Claims, 10 Drawing Sheets

(51) Int. Cl.
    *B01D 65/08*     (2006.01)
    *C02F 1/44*     (2006.01)
    *C02F 3/12*     (2006.01)
    *C02F 103/08*     (2006.01)

(52) U.S. Cl.
    CPC ...... *B01D 2321/04* (2013.01); *B01D 2321/06* (2013.01); *B01D 2321/2083* (2013.01); *C02F 1/441* (2013.01); *C02F 3/1268* (2013.01); *C02F 2103/08* (2013.01); *C02F 2209/44* (2013.01); *Y02W 10/15* (2015.05); *Y02W 10/30* (2015.05)

(56) References Cited

U.S. PATENT DOCUMENTS

2009/0045144 A1*   2/2009   Cohen et al. ............ 210/745
2009/0120873 A1*   5/2009   Becker et al. ............ 210/636
2010/0212319 A1*   8/2010   Donovan ............ F01K 27/005
                                              60/649

OTHER PUBLICATIONS

Written Opinion for PCT application No. PCT/IB2010/055412 issued by the ISA/EU dated Nov. 25, 2011.
Written Opinion for PCT application No. PCT/IB2010/055412 issued by the ISA/EU dated Jan. 9, 2012.
International Preliminary Report on Patentability (IPRP) issued by the IPEA/EPO dated Mar. 13, 2012.

* cited by examiner

RECIPROCAL ENHANCEMENT OF REVERSE OSMOSIS AND FORWARD OSMOSIS

CROSS REFERENCE TO RELATED APPLICATIONS

This application claims the benefit of U.S. Provisional Patent Applications No. 61/358,969 filed on Jun. 28, 2010, and U.S. Provisional Patent Applications No. 61/264,256 filed on Nov. 25, 2009, which are incorporated herein by reference.

BACKGROUND

1. Technical Field

The present invention relates to the field of desalination, and more particularly, to recovery of osmotic power.

2. Discussion of Related Art

In reverse osmosis (RO) desalination, water is extracted through a membrane from a pressurized feed, generating pressurized brine. The brine is both gauge pressurized (mechanical pressure) and osmotic pressurized (having a high salt concentration). Efforts have been to conducted to use the pressure of the brine to pressurize the feed, thereby recovering some of the high energy costs involved in pressurizing the feed.

Work or pressure exchangers (e.g. DWEER, ERI) are basically reciprocal pumping devices that are filled up by low pressure seawater in the first part of the cycle and are pressurized by valves exposed to high brine pressure in the second part of cycle. Work exchangers transform with high efficiency the gauge pressure of the brine to gauge pressure of the feed, as illustrated in FIGS. 1A and 1B.

Figure 1A:
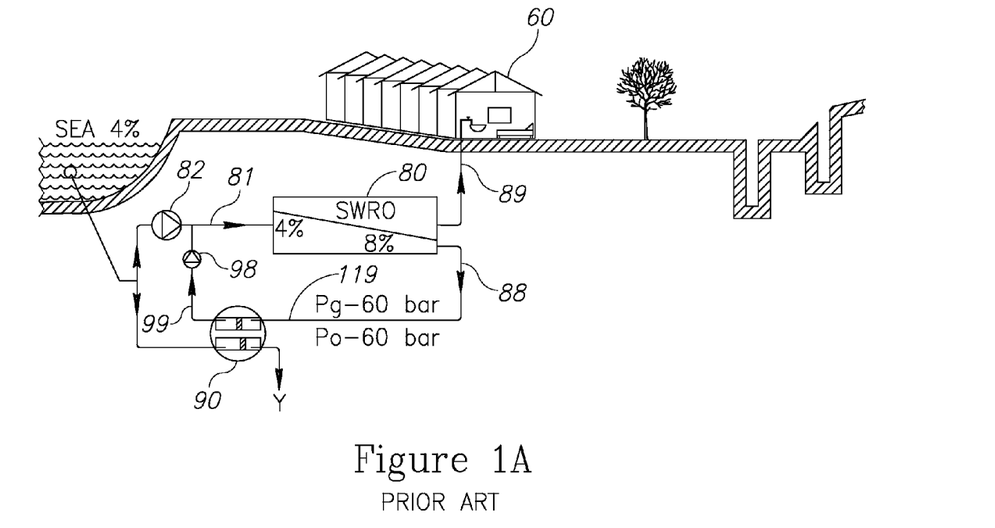
FIGS. 1A and 1B illustrate a desalination system and a waste water treatment system according to prior art.
Figure 1B:
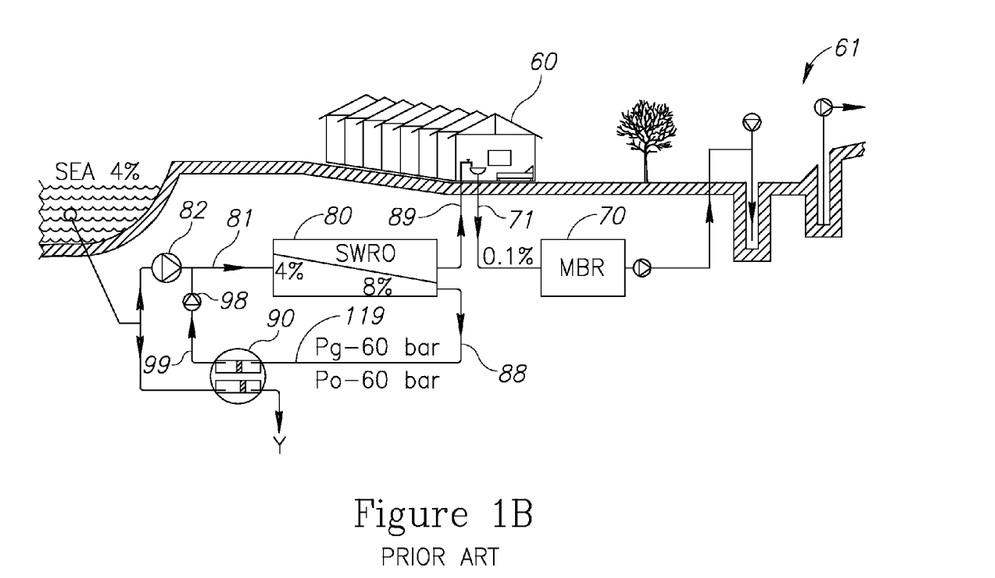

FIGS. 1A and 1B illustrate a desalination system and a waste water treatment system according to prior art. The desalination system comprises a reverse osmosis (RO) unit (e.g. sea water reverse osmosis—SWRO) 80 receiving seawater through an input 81 and producing product water supplied to consumers 60 (via output 89). Seawater is pumped by main pump 82 to input 81, and the pressure of the generated brine (in output 88) is recovered by a work exchanger 90 that receives seawater and uses the brine gauge pressure (received at input 119) to pump the water through output 99 and an auxiliary pump 98 to input 81. Waste water from consumers 60 is collected (71) and is treated, e.g. by a membrane bioreactor 70 and further by sewage treatment facilities 61.

For example, Mediterranean seawater has 4% salinity and an osmotic pressure of approximately 30 bar. Seawater is pressurized to a gauge pressure of approximately 62 bar by high pressure pump 82 and passes along several RO membranes located in pressure vessels 80 from the feed entrance 81 to the brine outlet 88. As the seawater moves along the feed side of the membranes, about 50% of the seawater penetrates the RO membranes and becomes desalinated product (permeate) and the residual 50% exits the pressure vessels and accumulates in salt concentration (8% salinity), twice the salinity of the feed seawater (4% salinity), and an osmotic pressure of approximately 60 bar (at brine outlet 88). As the feed flows through pressure vessels 80, the gauge pressure drops slightly by 1.5% and remains at approximately 60 bar. Work exchanger 90 receives the gauge pressurized brine (at 119) and transmit the gauge pressure to the feed (at 99) with some loss of pressure. A low pressure pump 98 is used to compensate for losses in pipelines and pressure vessels, which is how the gauge pressure of the brine is recovered and transferred to pressurize the feed seawater (at 81), sparing much of the work of high pressure pump 82. This process has an extremely high efficiency of 96% for power transportation from the brine to the seawater feed stream.

While recovering the gauge pressure of the brine is carried out with high efficiency as explained above, recovering the osmotic pressure of the brine is currently in very initial stages of development.

For example, Statkraft, a leading player in Europe in renewable energy based out of Norway, implemented an Osmotic Power Generation system based on penetration of river water to ocean water through semi-permeable membranes by forward osmosis (FO, see below).

River water has a low osmotic pressure (POr) of 0.3 bars and a low gauge pressure (PGr) of 5 bars). Ocean water has a higher gauge pressure (PGo) of 30 bars and a natural osmotic pressure (POo) of 30 bars. The high osmotic pressure of the ocean water allows river water to penetrate the RO membranes, producing energy that can be recovered by a hydraulic turbine and converted to electricity by an electrical generator. However, this method is characterized by the following disadvantages: (1) Water treatment—Both the river and ocean water have to be intensively cleaned to remove all suspended solids. (2) Pumping Energy—Ocean water has to be pumped to a pressure of about 30 bars and all flow restrictions including piping, pipe fittings and equipment losses associated with this transfer must be considered. (3) Energy Transfer Efficiency—There are large energy losses associated with the recovery of energy via turbine and electrical generator, for example, combining 1 m3/s of ocean water with 1 m3/r river water through semi-permeable membranes produces approximately 410 KWh (calculation basis: the above mentioned pressures, 85% pumping efficiency of sea water and river water, 97% motor efficiency result in pre-pressure power consumptions of 3639 KWh for ocean water and 606 KWh for river water, which are reduced from an energy gain of 4665 KWh from the process, assuming 88% turbine efficiency and 96% generator efficiency).

Figure 1C:
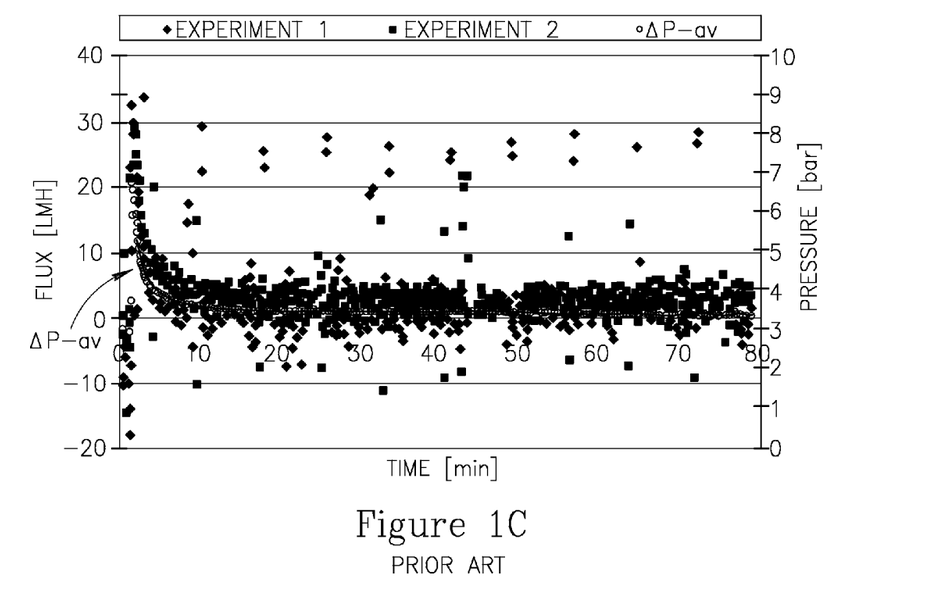
FIGS. 1C-1E illustrate the buildup of concentration polarization across a FO membrane, according to the prior art.
Figure 1D:
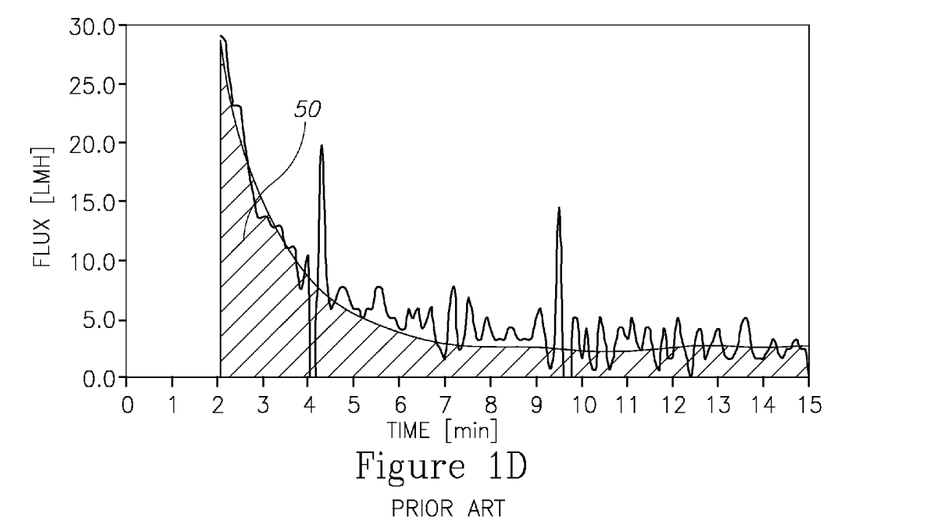
Figure 1E:
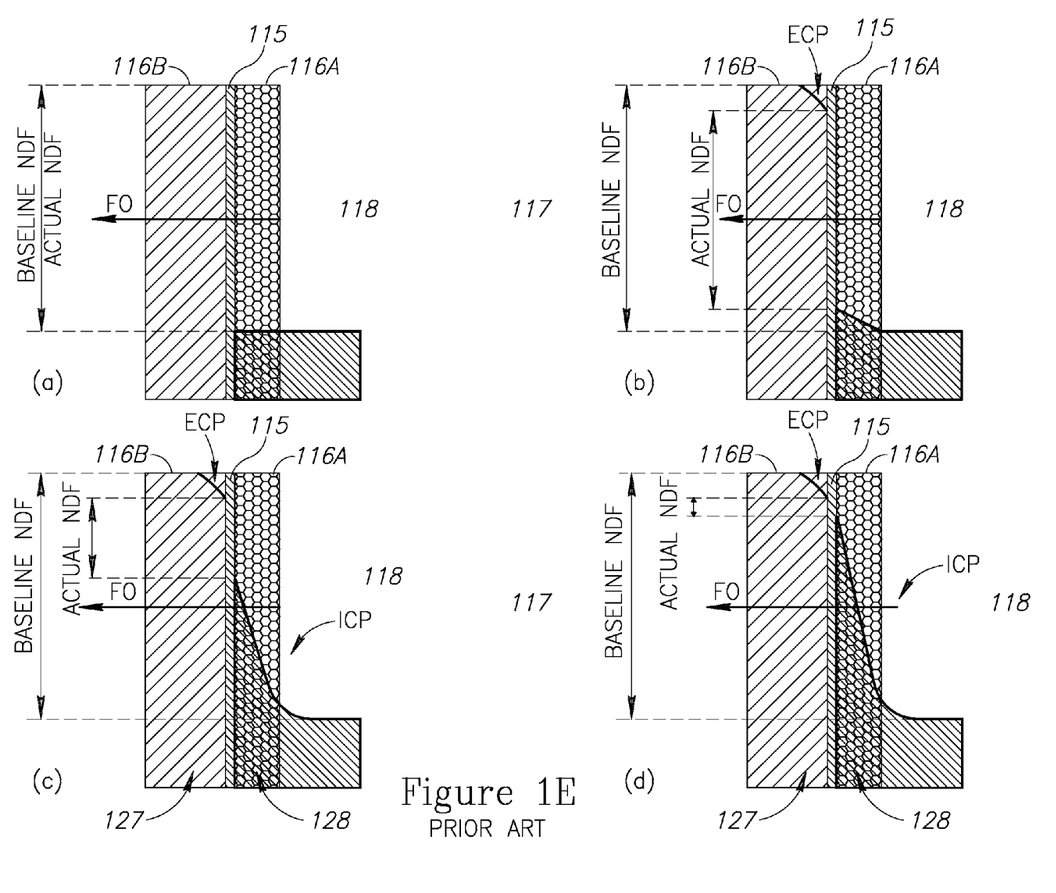

Forward osmosis (FO) is a concentration-driven membrane process, which utilizes the osmotic pressure difference across a selectively permeable membrane as the driving force for the transport of water through the membrane, from a low osmotic pressure "feed" solution into a concentrated "draw" solution having high osmotic pressure. Different applications and implementations of the process were suggested over the years. The process that counteracts Forward Osmotic Process is concentration polarization, as illustrated in FIGS. 1C-1E. Concentration polarization (CP) is an important issue in forward osmosis processes and it is coupled effect of internal dilutive CP (IDCP) and external concentrative CP (ECCP), or Dilutive External CP (DECP) and Internal Concentrative CP ICCP (FIG. 1E). The different type of concentration polarization comes from different scheme of draw solution movement near the support layer of near salt rejection skin. Those types of CP limit FO flux and efficiency of the process to such extend that making it not cost effective.

Compared with pressure-driven RO membrane processes, the FO process exhibits unparalleled advantages of nearly no hydraulic pressure operation, nearly complete rejection of many contaminants, and potentially low membrane fouling tendency. As a result, FO has received intensive studies recently for a range of potential applications, which include wastewater treatment, water purification, seawater desalination, as well as power generation. However, there exist a number of technical barriers that impede FOs industrial applications, a main technical barrier is Concentration Polarization which is explained below.

RO membranes have an asymmetric structure, typically consisting of a thin selective active layer supported by thick layers of porous polymer and fabric termed "Support Layer". The membranes used by the FO process are, in principle, similar to those used in RO, in that the properties of the rejecting layer of the membranes may be identical. FO membranes, however, differ in the thickness of the support layers, which must be much thinner to diminish concentration polarization barrier effect.

FIGS. 1C-1E illustrate the buildup of concentration polarization across a FO membrane, according to the prior art. FIG. 1C presents experimental results illustrating the reduction in the efficiency of the FO process over time, FIG. 1D illustrates schematically an overall product gain 50 in the FO process under action of CP, and FIG. 1E schematically illustrates the buildup of CP across the membrane.

FIG. 1C illustrates two experiments in which waste water had 0.1% salinity, brine 7.7% salinity, temperature ranged 30-34° at two flow rates: (1) 160-170 liter/hour at 5.1-8 bar, (2) 74-78 liter/hour at 2.7-4.8 bar, and an average pressure. The flux through the membrane decreased from 29 Liters per square Meter per Hour (LMH) at the commencement of operation to ca. 2.5 LMH at steady state. FIG. 1D is a schematic representation of the first 15 minutes of the graph of FIG. 1C.

Feed flow moving by osmotic forces in to draw solution via support 116 and membrane rejection layer 115 leaves salt in support layer 116. This feed water movement provides two effects: The First effect is salt concentration in side support layer ICCP. The Second effect is EDCP. From beginning of FO process the flux is quit high 30 LMH and it takes about 6-9 minute to develop full ICCP. When the ICCP process is fully developed flux is diminished to about 2.5 LMH.

Internal and external concentration polarization (ICP and ECP, FIG. 1E) occur during the mass transport process, and significantly reduce the available osmotic driving force. The concentration polarization phenomena are associated with solute physical properties, fluid dynamics and, most significantly, the membrane structure. The ECP can be controlled hydro dynamically but the ICP occurs in the porous support layer of the membrane, making it difficult to handle. A main effort in the FO industry is to produce a membrane that minimize the ICP.

FIG. 1E illustrates the buildup of concentration polarization in the prior art. Stages (a)-(d) illustrate the concentration gradient across membrane 115 and support layers 116A, 116B at sequential time points along the first ca. 10 minutes of the graphs presented in FIGS. 1C and 1D. (a) illustrates the initial operation of the FO process, as the full baseline NDF drives water extraction. (b) and (c) illustrate consequent intermediate stages in the build up of CP, namely the accumulation of solutes at the feed side 118 of membrane 115 and the dilution of the draw solution at the draw side 117 of membrane 115. The actual NDF arises only from the difference between the reduced concentration gradient in support layers 116A, 116B across membrane 115. (d) illustrates the final CP across membrane 115, that actually dominates prior art FO processes as it occurs from ca. 10 minutes after activation of the FO process, in which the actual NDF is minimal.

BRIEF SUMMARY

Embodiments of the present invention provide a method comprising alternately operating a semi-permeable membrane element in forward osmosis (FO) and in reverse osmosis (RO), to periodically flush out a concentration polarization across the semi-permeable membrane.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

For a better understanding of the invention, the usages of the following terms in the present disclosure are defined in a non-limiting manner:

The term "concentration polarization (CP)" as used herein in this application, is defined as the changes in concentrations of draw and feed solution in a volume that is adjacent to membrane 115. In particular it constitutes a dilution of the draw solution in volume 127 (see FIG. 1E) and concentration by accumulating salt of the feed solution in volume 128 (see FIG. 1E) which combined reduce the concentration gradient across membrane 115. The former is termed internal dilutive CP (IDCP) or Dilutive External CP (DECP) and in the following description is uniformly termed External CP-ECP, and the latter is termed external concentrative CP (ECCP) or Internal Concentrative CP ICCP and in the following description is uniformly termed Internal CP-ICP.

The term "forward osmosis (FO)" as used herein in this application, is defined as extracting water through a semi-permeable membrane from a feed solution into a draw solution along a gradient of osmotic pressure. The draw solution is more concentrated than the feed solution and draws water through the membrane. FO comprises various applications of this principles, such as direct osmosis (DO), pressure retarded osmosis (PRO) etc.

The term "reverse osmosis (RO)" as used herein in this application, is defined as extracting water through a semi-permeable membrane from a feed solution against a gradient of osmotic pressure, by applying a gauge (mechanical) pressure that is larger than the osmotic pressure gradient.

The definitions of membrane sides and subscripts as used herein in this application, are the following. In this application, two processes are applied alternately to the membrane—a FO process in which water from low salinity water (such as treated waste water) is extracted into a draw solution such as a brine, and a RO process on the same membrane, in which the draw solution (on FO draw side 117, see FIGS. 2D, 4B) is temporarily replaced by a gauge pressurized flushing solution with low salinity (e.g. waste water or diluted brine), from which water is extracted through the membrane into the low salinity water on the (FO feed) side 118 (see FIGS. 2D, 4B). In the RO process, FO draw side 117 functions as RO feed side, and FO feed side 118 functions as RO product side. The temporary RO process is also termed wash, or flush out. Pressures, concentrations and volumes are denoted by various subscripts in the following. Subscripts b (brine), d (draw), fl (flush out) refer to side 117, subscripts w (waste water), f (feed) refer to side 118. Additional subscripts i and o refer to input and output.

The present patent application discloses reciprocal enhancement of forwards osmosis and reverse osmosis processes. Forward osmosis is enhanced by periodically flushing out the membrane by reverse osmosis, and reverse osmosis is enhanced by osmotic power recovery of the brine by increasing its volume using forward osmosis, wherein synergistically, reverse osmosis enhancement of forward osmosis increases the forward osmosis enhancement of reverse osmosis, by increasing the osmotic power recovery efficiency.

The present patent application offers completely different way to overcome CP problem, namely applying a speedy membrane cleaning procedure. The present invention uses the RO osmotic process for cleaning membrane fouled by salt in forward osmosis process. Injection of small amount of low salinity solution into draw solution changes the process from FO to RO and by this flush out salt from support layer in to main stream of feed solution. Frequency of FO-RO process can be arranged, for example, in such way: 90 second FO process and 10 seconds RO process. The invention is illustrates in but is not limited to an example of using treated waste water as the low salinity source.

FIGS. 2A to 2D, 3A and 4A are high level schematic block diagrams of a desalination system with an osmotic power recovery unit 100, according to some embodiments of the invention.

Figure 2A:
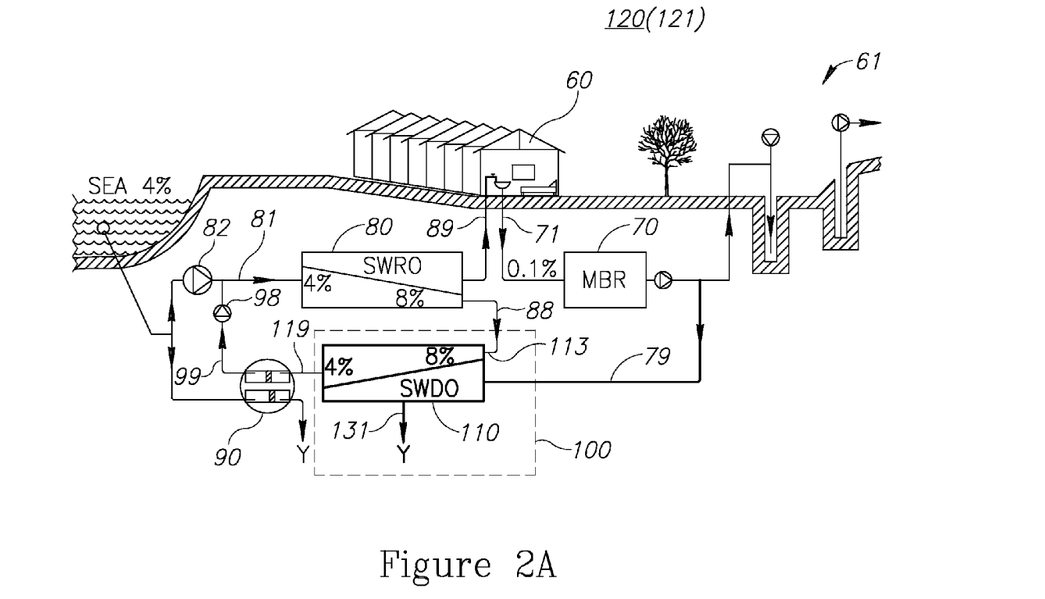
FIGS. 2A to 2D, 3A and 4A are high level schematic block diagrams of a desalination system with an osmotic power recovery unit, according to some embodiments of the invention.

FIG. 2A illustrates the desalination system with osmotic power recovery unit 100 that comprises a semi-permeable membrane element 110 having semi-permeable membrane 115 (e.g. sea water direct osmosis SWDO) arranged to extract water from a feed solution (received through input 79) into a draw solution (received through input 113). Osmotic power recovery unit 100 is characterized in that it is arranged to periodically operate semi-permeable membrane element 110 in an opposite direction, i.e. in reverse osmosis, to yield product extraction on feed side 79 of membrane 115, to flush out and eliminate a concentration polarization across membrane 115.

Osmotic power recovery unit 100 may further comprise a gauge pressurized low salinity water source 78 and a valve unit 77 arranged to periodically add gauge pressurized low salinity water therefrom to the draw solution at input 113 to invert a net driving force 112 across membrane 115. Alternatively, valve unit 77 may be arranged to periodically replace the draw solution with gauge pressurized low salinity water from source 78. For example, treated waste water from membrane bioreactor 70 may be used as the low salinity water. Membrane 115 may be flushed out by any flushing solution replacing the draw solution, preferably the flushing solution may have a low osmotic pressure and the same gauge pressure as the draw solution.

Semi-permeable membrane element 110 is operable in forward osmosis and characterized in that it is arranged to periodically operate in reverse osmosis to yield product extraction on feed side 118 of semi-permeable membrane 110, to flush out salt and diluted draw solution from the vicinity of semi permeable membrane 115.

Figure 7A:
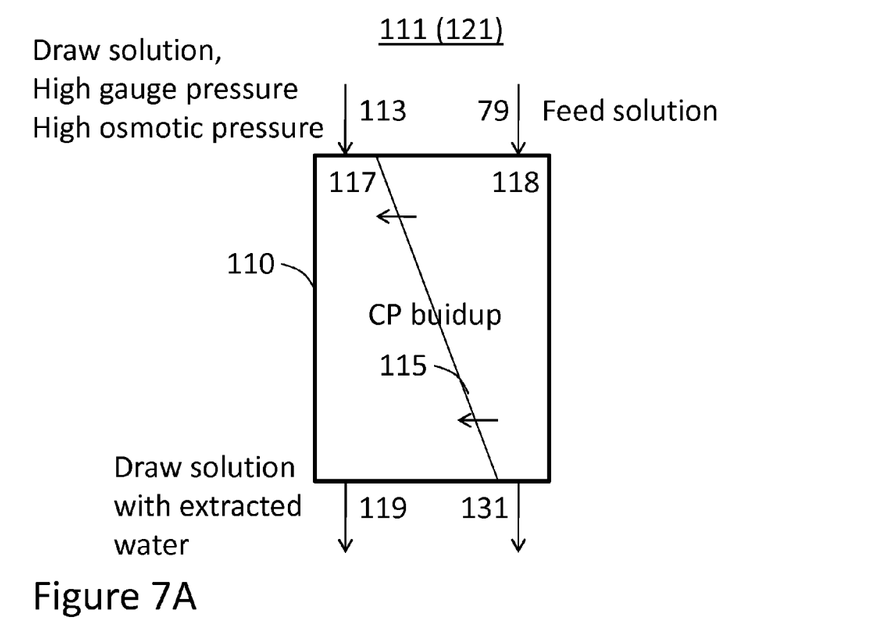
FIGS. 7A and 7B schematically illustrate a forward osmosis (FO) unit, according to some embodiments of the invention.
Figure 7B:
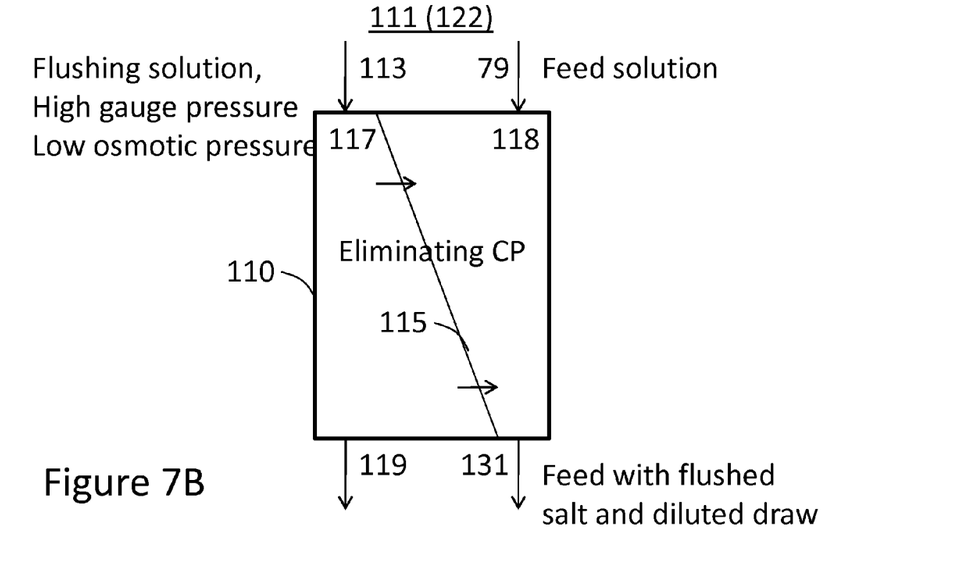

FIGS. 7A and 7B schematically illustrate a forward osmosis (FO) unit 111, according to some embodiments of the invention. Semi-permeable membrane element 110 may be part of an independent forward osmosis (FO) unit 111 (FIGS. 7A, 7B) that is arranged to extract water from a feed solution into a draw solution, wherein the feed solution and the draw solution are separated by semi-permeable membrane 115. FO unit 111 is further arranged to alternately operate semi-permeable membrane element 110 in forward osmosis (FO) and in reverse osmosis (RO), to periodically flush out a concentration polarization across semi-permeable membrane 115 by introducing a flushing solution into the drawing side of semi-permeable membrane element 115.

In FIGS. 2A, 2C, 3A, and 4A, FO unit 111 is depicted in its functioning within osmotic power recovery unit 100, yet FO unit 111 may comprise a feed water source and a draw solution source and be operated in any other way, for example in a FO desalination system.

As illustrated in FIG. 7A, in its FO operation 121, FO unit 111 may receive draw solution with high gauge and osmotic pressures on draw side 117 and extract water from a feed on side 118. As illustrated in FIG. 7B, in its RO operation 122, FO unit 111 may receive flushing solution with a high gauge pressure and a low osmotic pressure on draw side 117 and flushes out salt and diluted draw solution that concentrate across membrane 115 as CP. The alteration between FO 121 and RO 122 may be periodical, with short RO phases 122 interrupting longer FO phases 121, and by eliminating CP increasing many times the efficiency of water extraction during FO phases 122.

In FO unit 111 the flushing solution comprises a gauge pressurized low salinity solution such as treated waste water from a membrane bioreactor (MBR). The flushing solution may have substantially the same gauge pressure as the draw solution it replaces, to avoid mechanical stresses on FO unit 111 and the pipes connected to its inputs (113, 79) and outputs (119, 131).

Osmotic power recovery unit 100 may be integrated in a desalination system further comprising RO desalination unit 80 receiving feed water (at input 81) and generating brine of high gauge and osmotic pressures (at output 88) and pressure exchanger 90 arranged to deliver feed water (via output 99, with additional pressure by auxiliary pump 98) to RO desalination unit 80 utilizing a pressure of a received fluid (at input 119). Osmotic power recovery unit 100 is arranged to receive the brine from RO desalination unit 80 (from RO output 88 via input 113) and deliver the generated fluid (via output 119) to pressure exchanger 90, thereby converting at least some of the osmotic pressure of the brine to an increased volume of the generated fluid.

In order to transfer the high osmotic pressure of RO brine into mechanical power, the brine stream has to be exposed to contact with the low osmotic pressure water stream (e.g. from a waste water treatment source 70) via semi-permeable membranes 115 (permeable to liquid and not permeable to salt ions). This can be accomplished in Membrane element 110 in pressure vessels similar to RO desalination pressure vessels. Semi-permeable membrane 115 has inlets 113, 79 and outlets 119 on both membrane sites. Membrane 115 may be a hollow fiber, a tubular, or a flat sheet RO membrane with an inlet and outlet on the permeate side of RO membrane. Membrane 115 thus allows waste water to pass through membrane 115 and also allows residuals of waste water that did not penetrate membrane 115 to be removed at outlet 131.

Membrane element 110 may comprise a Semi-permeable membrane element, a RO membrane element, a pressure retarded osmosis (PRO) membrane element or another membrane element arranged to support and optimize both FO (e.g. reduce CP buildup or increase throughput) and RO (e.g. quick wash out of CP).

Figure 2B:
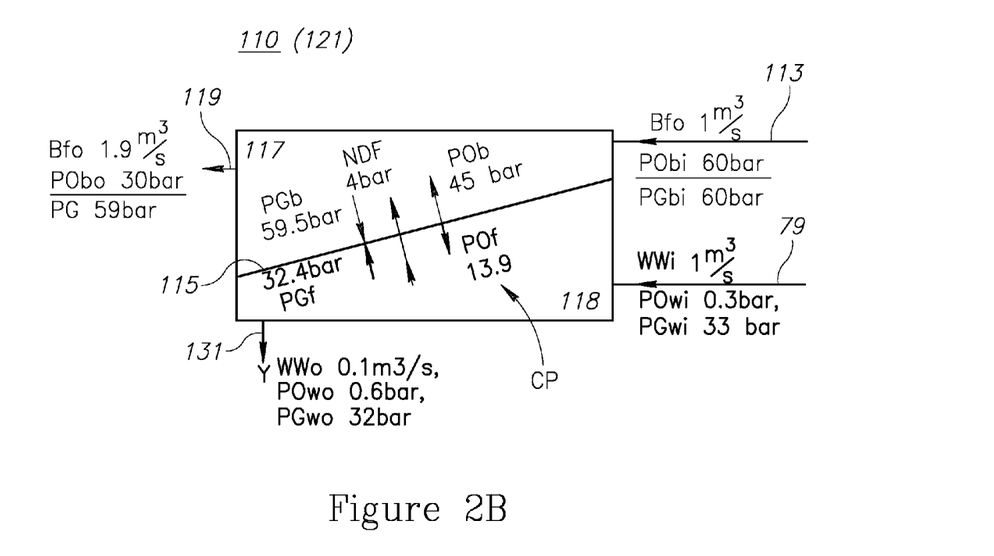

FIG. 2B illustrates the net driving force (NDF) in the forward osmosis process, according to some embodiments of the invention.

EXAMPLE 1

The following example (illustrated in FIG. 2B) is presented for the following values of pressures and mass balance of flow entering and exiting membrane element 110 (the FO drawing side of membrane 115 which receives the brine is denoted by 117, the FO feed side is denoted by 118): Bfi—Flow brine in (e.g. 1 m³/sec), Bfo—Flow brine out (e.g. 1.9 m³/sec), WWi—Flow waste water in (e.g. 1 m³/sec), WWo—Flow waste water out (e.g. 0.1 m³/sec), PObi—Osmotic pressure brine in (e.g. 60 bar), PObo—Osmotic pressure brine out (e.g. 30 bar), POwi—Osmotic pressure waste water in (e.g. 0.3 bar), POwo—Osmotic pressure waste water out (e.g. 0.6 bar), PGbi—Gauge pressure brine in (e.g. 60 bar), PGbo—Gauge pressure brine out (e.g. 59.9 bar), PGwi—Gauge pressure waste water in (e.g. 33 bar), PGwo—Gauge pressure waste water out (e.g. 32 bar), the net driving pressure (NDF) that provide penetration of waste water into the stream of brine is calculated as follows: PGb−PGw−POb+POw=59.5−32.4−31.6+0.45=−4.0 bar Since the NDF is −4.0 bar, the waste water stream at a gauge pressure of 32.4 bar flows through membrane 115 to a gauge pressure of 59.5 bar. As a result, brine flow increases from 1 m³/sec to 1.9 m³/sec. In addition, the salinity of the brine decreases and the resulting osmotic pressure of the brine diminishes from 60 bar at inlet 113 to 30 bar at outlet 119.

Recovered power can be calculated with the above parameters as the difference between the energy gained by additional pressure recovery at pressure exchanger 90 and the energy used to pressurize the waste water. Assuming power exchanger efficiency at 96% and overall waste water pumping efficiency at 83%, the net power recovery from osmotic pressure only is 2293 KWh (7957 KWh-5664 KWh).

Work exchanger 90 simultaneously recovers power from gauge and osmotic pressures and provide power generation of 11,677 KWh. The net power generation from osmotic pressure alone is 2,293 KWh. This 2,293 KWh power generation in simultaneous cycle is 5.6 times greater than the osmotic power recovery by the discussed prior art from non simultaneous osmotic pressure generation (resulting in a gain of 410 KWh for the same input parameters, namely 1 m³/sec seawater and 1 m³/s low salinity water source).

Figure 2C:
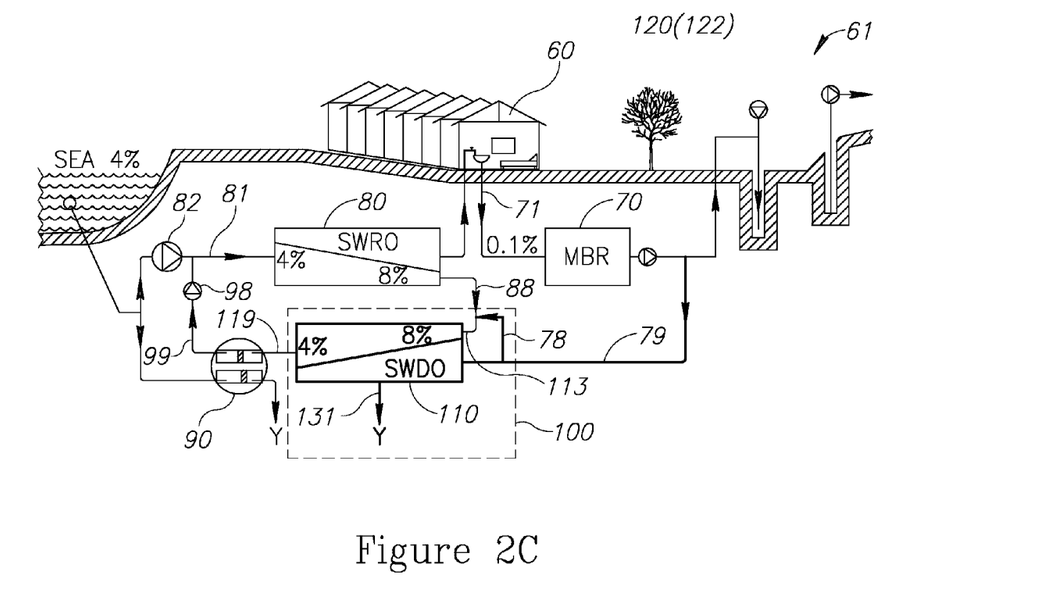
Figure 2D:
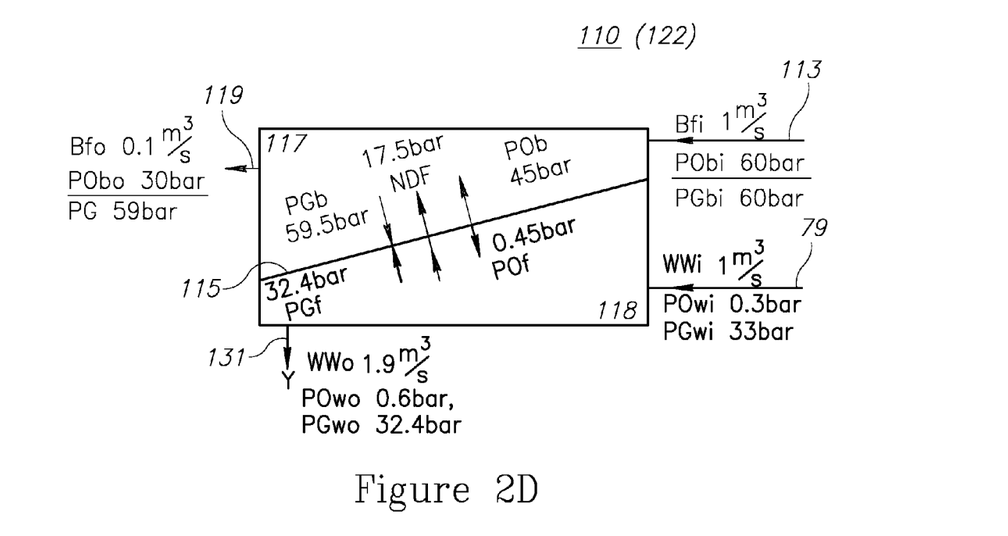

FIG. 2C illustrates the desalination system in its flushing state (122). In the washing, or flushing, state, a flushing solution such as low salinity water is injected (via pipe 78) in to input 113 of membrane element 110 in place or in addition to the brine to invert the net driving force across membrane 115. FIG. 2D illustrates the pressures around membrane 115 of membrane element 110.

During the flushing phase, in which the FO process is inverted, and the CP is washed out from membrane 115 by a temporary RO process, the following values of pressures and mass balance of flow entering and exiting membrane element 110 are included in example 1: Bfi—Flow brine in (e.g. 1 m³/sec), Bfo—Flow brine out (e.g. 0.1 m³/sec), WWi—Flow waste water in (e.g. 1 m³/sec), WWo—Flow waste water out (e.g. 1.9 m³/sec), PObi—Osmotic pressure brine in (e.g. 60 bar), PObo—Osmotic pressure brine out (e.g. 30 bar), POwi—Osmotic pressure waste water in (e.g. 0.3 bar), POwo—Osmotic pressure waste water out (e.g. 0.6 bar), PGbi—Gauge pressure brine in (e.g. 60 bar), PGbo—Gauge pressure brine out (e.g. 59.9 bar), PGwi—Gauge pressure waste water in (e.g. 33 bar), PGwo—Gauge pressure waste water out (e.g. 32 bar), the net driving pressure (NDF) that provide penetration of waste water into the stream of brine is calculated as follows: PGb−PGw−POb+POw=−59.5+45+32.4−0.45=17.5 bar in the direction from feed side 118 to draw side 117.

In the reverse process (122) the high osmotic pressure of the brine is replaced by a low osmotic pressure of waste water or diluted brine to invert NDF. Accordingly, the large flow output changes temporarily from brine output 119 to waste water output 131. The gauge pressures on both sides are preferably substantially conserved during changing FO and RO to avoid mechanical damage to the system. Only osmotic pressures of the fluid on draw side 118 is changed.

Table 1 summarizes the pressures at the beginning of the FO stage (121), at the end of the FO stage (121), and at the beginning of the flushing RO phase (122). The pressures at the end of the flushing process are those of the beginning of the FO phase, without CP.

TABLE 1

Gauge and osmotic pressures in the processes (FIGS. 2A-2D)

| Side of membrane Process | PGb/fl | POb/fl | PGf | POf | NDF |
|---|---|---|---|---|---|
| | 117 | 117 | 118 | 118 | 118→117 |
| FO no CP (121, at the end of the flush out 2D) | −59.5 | 45 | 32.4 | −0.45 | 17.5 |
| FO with CP (121, 2B) | −59.5 | 45 | 32.4 | −13.9 | 4 |
| RO, at the beginning of the flush out (122) | −59.5 | 0.45 | 32.4 | −13.9 | −40.5 |

Table 1 illustrates the gauge (PG) and osmotic (PO) pressures in the processes (FIGS. 2A-2D) on both sides of membrane 115. The pressures are denoted as positive when they act in the direction of the FO process (from side 118 to side 117 of membrane 115) and as negative when they act in the opposite direction (from side 117 to side 118 of membrane 115).

In embodiments of the invention, an additional pressure exchanger may be connected to the brine exiting RO unit 80 to regulate the gauge pressure of the brine before it is inputted into power recovery unit 110. In embodiments, a pressure exchanger may be used to regulate the gauge pressure of incoming flushing solution (at 78), e.g., to equal the gauge pressure of the brine.

FIGS. 3A, 3B, 4A and 4B illustrate schematically the operation of osmotic power recovery unit 100, according to some embodiments of the invention.

EXAMPLE 2

Figure 3A:
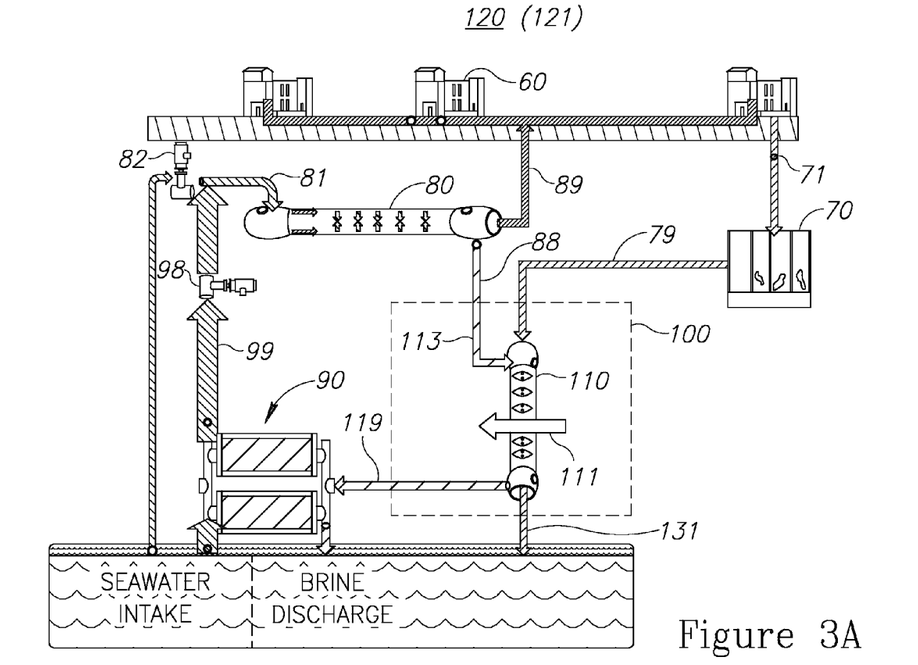
Figure 3B:
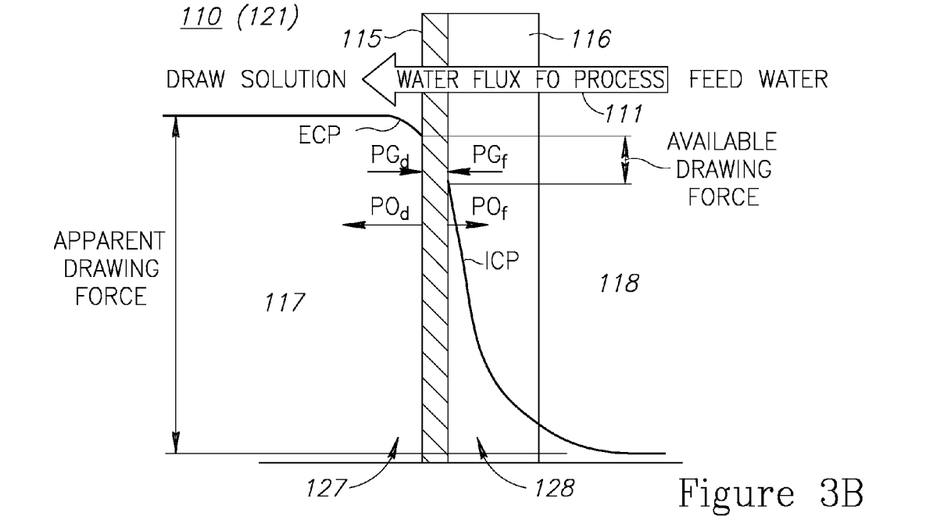
FIGS. 3B and 4B illustrate schematically the operation of the osmotic power recovery unit, according to some embodiments of the invention.
Figure 4A:
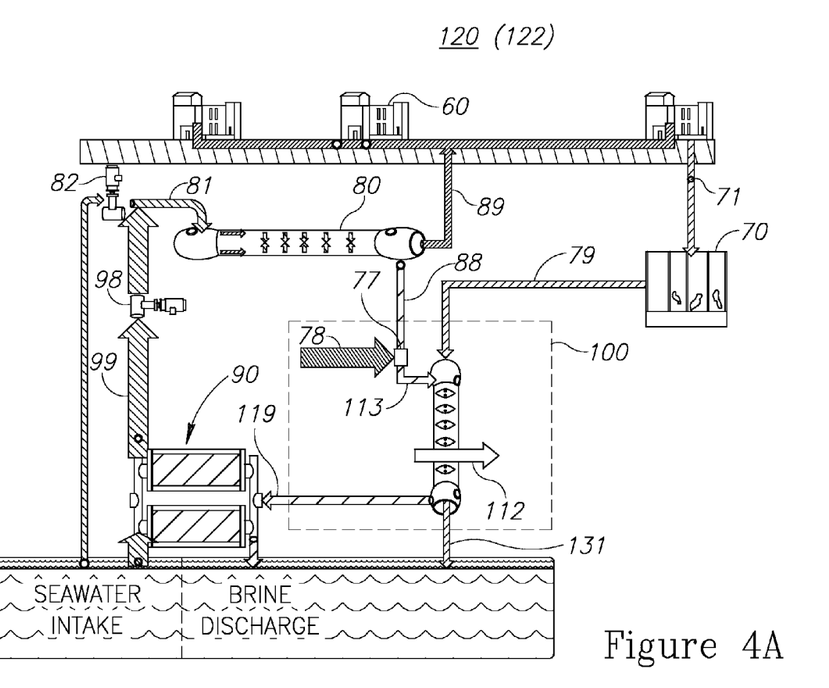
Figure 4B:
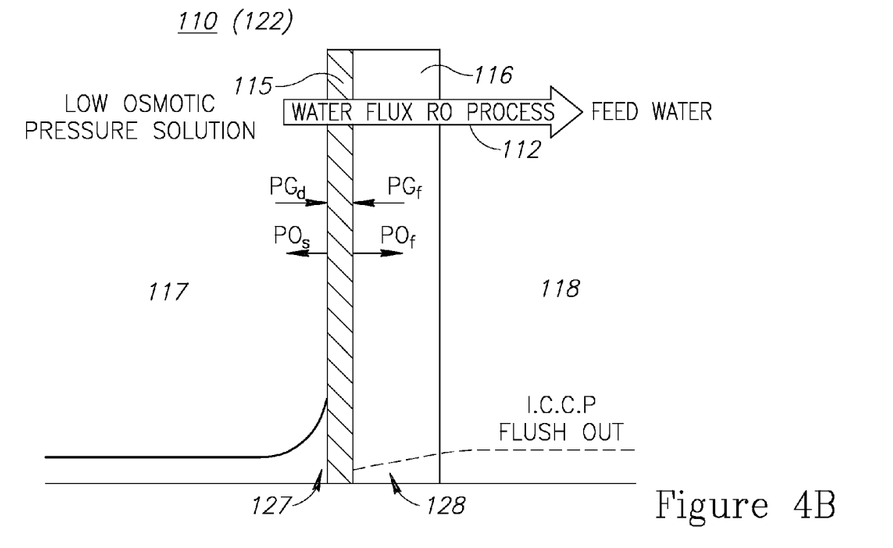

The process is exemplified using Pressure Retarded Osmosis (PRO) as one of many FO applications. FIG. 3A illustrates the desalination system at a FO state (121) of recovering osmotic pressure of the brine generated by RO unit 80, FIG. 3B illustrates the pressures on membrane 115 (as rejection layer) in this state (121), with the CP that is built (across membrane 115, in volume 127 as external CP and in volume 128 as internal CP, e.g. in support layer 116) by the end of the FO stage. FIG. 4A illustrates the desalination system at a RO, or washing state (122) of removing the CP in order to rehabilitate the osmotic gradient across membrane 115, such as to efficiently re-apply the FO process. FIG. 4B illustrates the pressures on membrane 115 in this state (122), without the CP, anticipating the inception of the next FO stage. Table 2 summarizes the pressures at the beginning of the FO stage (121), at the end of the FO stage (121), and at the beginning of the flushing phase (122). The pressures at the end of the flushing process are those of the beginning of the FO phase, without CP.

TABLE 2

Gauge and osmotic pressures in the processes (FIGS. 3A, 3B, 4A, 4B)

| | PGd/fl | POd/fl | PGf | POf | NDF |
|---|---|---|---|---|---|
| Side of membrane Process | 117 | 117 | 118 | 118 | 118→117 |
| FO no CP (121, 4B) | −40 | 60 | 7 | −5 | 22 |
| FO with CP (121, 3B) | −40 | 55 | 7 | −20 | 2 |
| RO, at the beginning of the wash (122) | −40 | 5 | 7 | −20 | −48 |

Table 2 illustrates the gauge (PG) and osmotic (PO) pressures in the processes (FIGS. 3A, 3B, 4A, 4B) on both sides of membrane 115. The pressures are denoted as positive when they act in the direction of the FO process (from side 118 to side 117 of membrane 115) and as negative when they act in the opposite direction (from side 117 to side 118 of membrane 115).

The gauge pressure of the draw solution PGd is for example 40 bar, and may be equal to the gauge pressure PGfl of the wash solution in the RO process of washing membrane 115, thereby clearing the CP.

The gauge pressure of the feed solution PGf is for example 7 bar, and may be equal during FO and RO processes.

The osmotic pressure of the draw solution POd is for example 60 bar, but decreases to 55 bar due to external CP (see ECP in (d) of FIG. 1E), which dilutes by some permeate water. In the wash process, low salinity water source 78 is added on draw side 117 to yield a low osmotic pressure wash solution, e.g. with POfl of 5 bar.

The osmotic pressure of the feed solution POf is for example 5 bar, but increases to 20 bar due to internal CP (see ICP in (d) of FIG. 1E). In the wash process, the osmotic pressure of the feed solution POf is initially equal to the CP osmotic pressure 20 bar.

This CP is washed and cleared by the low salinity water from source 78 crossing membrane 115 in the RO washing process due to the removal of the high osmotic pressure of the draw solution.

In terms of net driving force (NDF): while the original NDF in the FO process is 22 bar, CP reduces it to 2 bar. The washing process introduces an opposite NDF of 48 bar which removes CP and allow membrane 115 to be operated again in FO in the original NDF of 22 bar.

The following calculations summarize the derivation of the NDF in each of the stages:

FO without CP (First minute, as in FIG. 1E (a)):

$$NDF=-PGd+POd+PGf-POf$$

$$NDF=-40+60+7-5=22 \text{ bar}$$

FO with CP (Steady state, as in FIG. 1E (d)):

$$NDF=-PGd+POd+PGf-POf$$

$$NDF\text{-}cp=-40+55+7-20=2 \text{ bar}$$

Flushing process: ICP and ECP flush out made by feeding to draw side of the membrane, for a predetermined injection time, without releasing the gauge pressure PGr of the FO process, low saline solution (LSS) having an osmotic pressure POs<POr chosen such that the net driving pressure becomes positive, e.g. at the beginning of the flushing $$NDF \text{ fl}=-PGfl+POfl+PGf-POf \text{ cp}$$

$$NDF\text{-}fl=-40+5+7-20=-48 \text{ bar}$$

as exemplified for the beginning of the process (FIG. 1E (d)).

FIG. 4B illustrates the state of membrane 115 at the end of flushing, after removal of CP (returning to FIG. 1E (a)).

The wave of LSS replaces draw solution in membrane module 110 for e.g. a few seconds and accordingly the FO process (121) for e.g. a few seconds is replaced by RO process (122). In beginning and in the end of fast salt flushing out both a RO separation process and a FO separation process take place simultaneously within the module.

CP can be considered as membrane fast fouling by salt and can be solved by methods of fast membrane cleaning. Such fast method of membrane cleaning is reverse flow. Flow can be reversed if salinity of draw solution is diminished below draw solution gauge pressure. Practically draw solution can be replaced for e.g. a few second by a feed solution that has osmotic pressure below gauge pressure of draw solution.

An example for the periodicity of washing membrane 115 is a wash process of 10 sec every 90 sec of FO process. Another example of the frequency of changing between FO and RO processes is 180 seconds FO process and 20 seconds RO process. Yet another example of operation periodicity is operating membrane element 110 in FO for 5-10, maximally 20 minutes, and then operating membrane element 110 in RO for 30-60 seconds, minimally 10 seconds.

Injection of low salinity solution can be done by any means. The durations of activating membrane 115 in FO and in RO may be determined according to the specific membrane characteristics, and according to measurements that may be carried out on specific modules.

Exemplary flow throughputs in illustrated FIG. 3A (state 121) are: 2 m$^3$/sec entering (via input 81) RO unit 80, that produces 1 m$^3$/sec product water (output 89) and 1 m$^3$/sec gauge and osmotic pressurized brine (via output 88). Membrane unit 110 receives 1 m$^3$/sec pressurized brine from RO unit 80 (via input 113) and 1 m$^3$/sec low salinity solution such as treated waste water at input 79. Membrane unit 110 extracts 0.9 Membrane unit 110 from the received waste water to generate 1.9 m³/sec diluted brine at substantially the same gauge pressure output 119. In this example almost all osmotic pressure of the brine is utilized and added to the gauge pressure for recovery by work exchanger 90. Work exchanger 90 delivers 1.9 m³/sec (via output 99) to auxiliary pump 98 and therefrom to input 81 of RO unit 80, leaving only 0.1 m³/sec to be pumped into input 81 by main pump 82, thereby recovering most gauge and osmotic power of the brine.

Figure 5A:
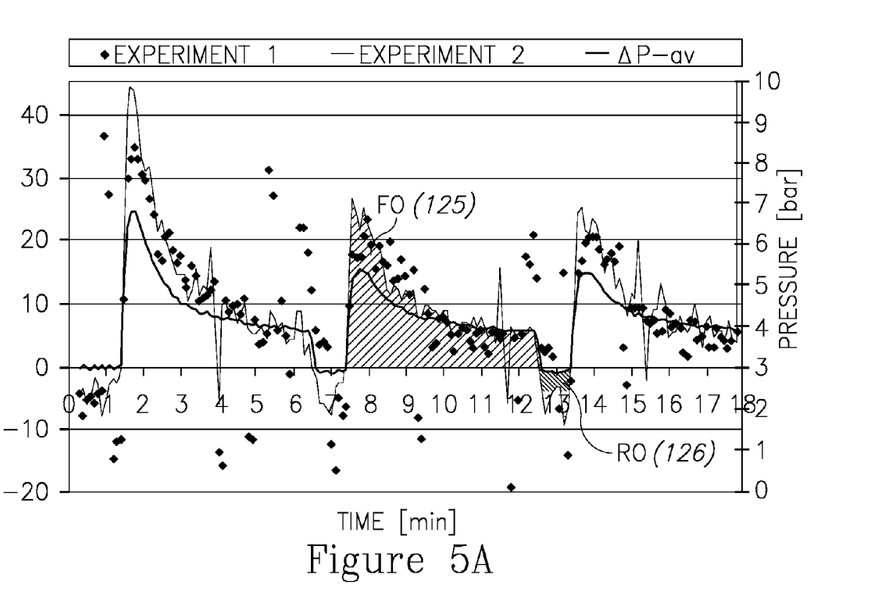
FIGS. 5A and 5B present experimental results illustrating the efficiency of the osmotic power recovery unit, according to some embodiments of the invention.
Figure 5B:
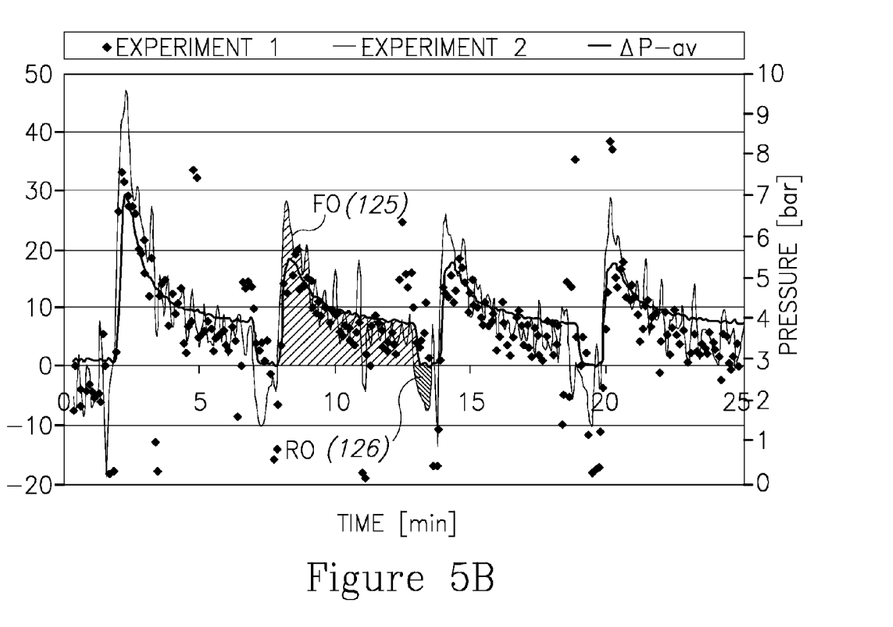

FIGS. 5A and 5B illustrate experimental results illustrating the efficiency of osmotic power recovery unit 110, according to some embodiments of the invention. In the test, FO process (121) was flushed out by RO process (122) by feeding to feed side 118 of membrane 115, for a predetermined injection time, without releasing the gauge pressure PGr of the RO process, low saline solution (LSS) having an osmotic pressure POs>POr.

The result illustrate that the large added volume achieved by periodically re-starting FO process as the coarsely hatched area marked FO (125) at cost of the small RO flow (fine hatched 126) during the membrane flushing (122). The overall osmotic pressure recovery is proportional to the overall flow volume of all FO restarts, which in the presented test results is a five fold increase in FO flow flux, from 2.5 liter per square meter and hour (LMH) in steady state FO with CP (50, FIG. 1D), to 13 LMH in FO with periodic RO flushes.

Figure 6:
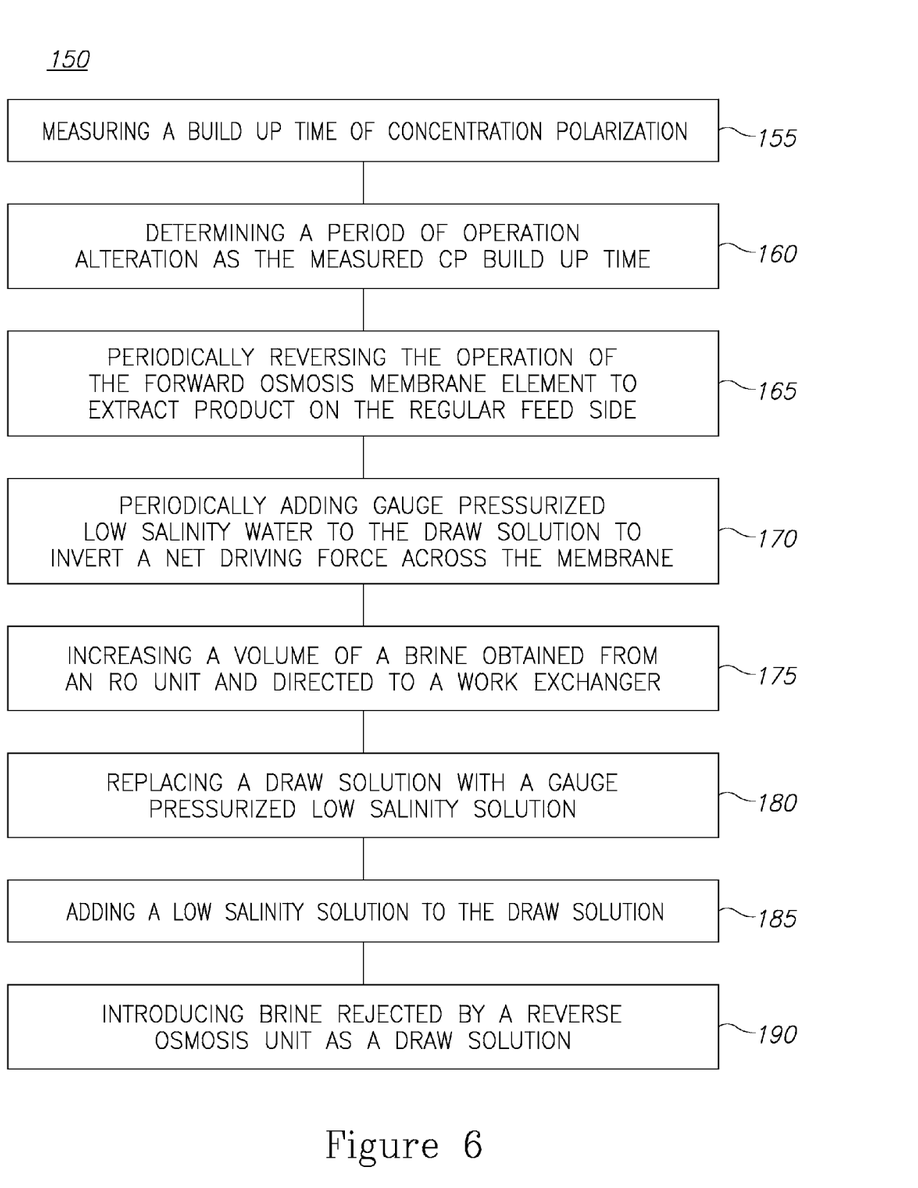
FIG. 6 is a schematic flowchart illustrating a method of osmotic power recovery, according to some embodiments of the invention.

FIG. 6 is a schematic flowchart illustrating a method 150 of osmotic power recovery, according to some embodiments of the invention. Method 150 may comprise periodically reversing the operation of the membrane to extract product on the regular feed side (stage 165) by e.g. periodically adding gauge pressurized low salinity water to the draw solution to invert a net driving force across the membrane (stage 170). Method 150 may further comprise the following stages: measuring a build up time of concentration polarization (stage 155); determining a period of operation alteration as the measured CP build up time (stage 160), e.g. in respect to a specified lower threshold of FO efficiency. Method 150 may comprise increasing a volume of a brine obtained from a RO unit and directed to a work exchanger (stage 175) to recover power from the osmotic pressure of the brine exiting the RO unit.

Method 150 comprises alternately operating semi-permeable membrane element 110 in forward osmosis (FO) and in reverse osmosis (RO), to periodically eliminate a concentration polarization across the semi-permeable membrane. The elimination of the concentration polarization comprises flushing out salt from a vicinity of the semi permeable membrane during the reverse osmosis.

Method 150 further comprises recovering brine osmotic pressure by introducing brine rejected by reverse osmosis unit 80 as a draw solution of semi-permeable membrane element 110 operated alternately in FO and RO to yield a diluted brine with an increased throughput at output 119; and recovering pressure from the diluted brine provided by semi-permeable membrane element 110, e.g. via pressure exchanger 90. The brine is gauge pressurized and the elimination of concentration polarization is carried out by a flushing solution introduced on the drawing side of the FO process and having substantially the same gauge pressure as the brine.

Method 150 may further comprise replacing a draw solution with a gauge pressurized low salinity solution (stage 180) or adding a low salinity solution to the draw solution (stage 185).

Method 150 may further comprise introducing brine rejected by a reverse osmosis unit as a draw solution 190 of membrane element 110 operated according to method 150.

Osmotic power recovery unit 100 may comprise membrane element 110 arranged to alternately: increase a volume of a brine obtained (via 113) from RO unit 80 (stage 175), by utilizing a high osmotic pressure of the brine to extract water from waste water by forward osmosis, to generate a fluid with a higher throughput and lower osmotic pressure than the brine, for delivery to pressure exchanger 90, wherein during the extraction an osmotic pressure gradient across membrane 115 between the brine and the waste water decreases due to concentration polarization, and removing the concentration polarization by adding waste water to the brine to generate a feed, and extracting water from the feed by reverse osmosis across membrane 115, to clear the concentration polarization (stage 170). The alteration of forward osmosis extraction and reverse osmosis extraction across membrane 115 is carried out periodically (stage 165) according to characteristics of concentration polarization buildup. A timing and an amount of adding the waste water are selected to yield an overall maximal power recovery by pressure exchanger 90, e.g. by measuring the buildup time (stage 155) and determining accordingly the alteration frequency (stage 160).

To summarize, the present invention flushes out CP in FO or PRO (pressure retarded osmosis) processes by providing periodically short RO. This osmotic process as a method of membrane cleaning comprises feeding to draw side of the membrane, for a predetermined injection time, without releasing the gauge pressure PGd of the FO process, solution having an osmotic pressure POs<POd chosen such that the net driving pressure becomes positive, whereby there is provided a flow of permeate towards the concentrative side of FO membranes as to flush out the concentration polarization salts in to balk of stream, wherein in the same time instance both a FO separation process and RO cleaning process take place simultaneously with in the module. In other words, in stream of draw solution with POd=60 bar periodically is injected for short time low salinity solution POs=5 bar.

The process on the membrane changes from PRO to RO and permeate moves in opposite direction from draw side to feed side and flush out internal concentrative CP in to the balk stream of feed water. Embodiments of the present invention uses the RO osmotic process for cleaning membrane fouled by salt in forward osmosis process. Injection of small amount of low salinity solution in to draw solution changes the process from FO to RO and by this flush out salt from support layer in to main stream of feed solution.

Advantageously, the present invention utilizes the cleanness of the brine that is generated from cleaned seawater, to enable washing membrane element 110 without damaging membrane element 110. Seawater undergoes intensive filtration to remove practically all suspended solids prior to entering the sea water RO desalination process. The present invention further utilizes the high osmotic pressure of the brine to regenerate power, in addition to gauge power recovery. The present invention allows for the simultaneous power recovery of gauge and osmotic pressure and gives a higher power yield that the two processed applied separately.

Furthermore, treated waste water is used as the low salinity water for the following reasons: (1) membrane bioreactors (MBRs) 70 are practically the most efficient ultra filtration membranes that remove all suspended solids from waste water and provide water suitable for contact with RO membranes. (2) The salinity of waste water remains low since it originates from drinking water. (3) The cost of MBR waste water is low. Ideally, water from the MBR waste water can be used for injecting into land, which separates ocean water from intrusion into land aquifer. MBR waste water cannot be used for vegetable and flower irrigation.

The combination of the three conditions of seawater desalination (cleanness and high osmotic pressure in addition to the high gauge pressure) and the three conditions of waste water modern treatment (cleanness, low salinity and low cost) provides the ability to recover high osmotic pressure in sea water RO brine, together with high gauge pressure, and transfer this energy to increased pumping capacity of the desalination system with minimal energy losses.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of energy recovery in a reverse osmosis (RO) unit, comprising:
    expanding a volume of gauge pressurized brine removed from the RO unit by forward osmosis over a semi permeable membrane from a low salinity solution, to enhance power recovery from the expanded pressurized brine via a pressure exchanger,
    periodically injecting gauge pressurized low salinity flushing water instead of the gauge pressurized brine to remove concentration polarization from the semi permeable membrane, to enhance a forward osmosis efficiency thereof, and
    gauge pressurizing seawater feed to the RO unit by the enhanced power recovery via the pressure exchanger.

2. The method of claim 1 wherein the periodical injection is carried out every 5 to 20 minutes for 10 to 60 seconds.

3. The method of claim 1, further comprising measuring a time period from a beginning of operating the semi-permeable membrane in forward osmosis to a time in which the concentration polarization reaches a specified threshold, and wherein the periodical injection is carried out with a period equal to the measured time period.

4. The method of claim 1, wherein the gauge pressurized low salinity flushing water has the same gauge pressure as the gauge pressurized brine.

5. The method of claim 1, wherein the low salinity flushing water is pressurized by the gauge pressurized brine.

6. The method of claim 1, further comprising selecting durations of a FO phase and of a flushing phase to maximize an overall pressure extracted by the pressure exchanger from the expanded pressurized brine and supplied by the pressure exchanger to the seawater feed.

\* \* \* \* \*